United States Patent [19]

Jorn et al.

[11] 4,007,924
[45] Feb. 15, 1977

[54] ELASTIC SUPPORT MOUNT

[75] Inventors: Raoul Jörn, Hengnau; Georg Lang, Giessen, both of Germany

[73] Assignee: Raoul Jörn, Hengnau, Germany

[22] Filed: June 27, 1975

[21] Appl. No.: 590,857

[52] U.S. Cl. .............................. 267/57.1 R; 403/228
[51] Int. Cl.² .......................................... F16F 1/38
[58] Field of Search .............. 267/57.1 R, 57.1 A,
 267/63 R, 63 A, 152, 153, 140; 403/226, 227, 228; 64/27 NM

[56] References Cited

UNITED STATES PATENTS

| 2,940,785 | 6/1960 | Haushalter | 267/57.1 R |
| 3,584,857 | 6/1971 | Hipsher | 267/57.1 R |
| 3,666,301 | 5/1972 | Jorn | 267/57.1 R |

*Primary Examiner*—James B. Marbert
*Attorney, Agent, or Firm*—Karl F. Ross; Herbert Dubno

[57] ABSTRACT

An elastic support mount for use between an outer member having an inner surface formed generally as a surface of revolution and an inner member in the outer member and having an outer surface formed generally as a surface of revolution comprises a solid (circumferentially continuous) elastomeric body of revolution having an outer surface directly engageable against the inner surface of the outer member and an inner surface directly engageable against the outer surface of the inner member. This body has at least one axially open end and is provided at this end with an inner metal sleeve and a coaxial outer metal sleeve which are imbedded in the elastomeric body at the open end and have axial lengths equal to a fraction of the overall length of the elastomeric body. In use this mount is axially compressed by snap rings or the like engaging only against the inner and outer rings so that it is forced into very tight frictional contact with the surfaces of the members between which it is mounted.

14 Claims, 22 Drawing Figures

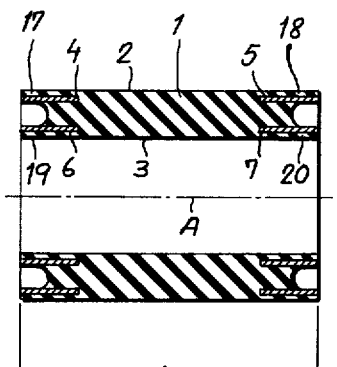
FIG. 1
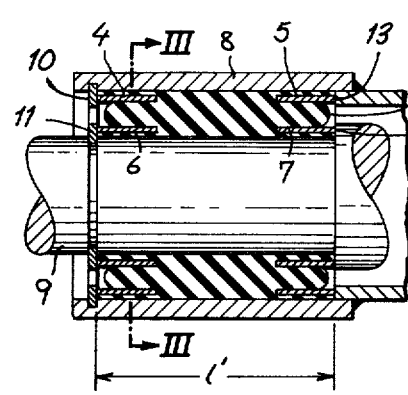
FIG. 2
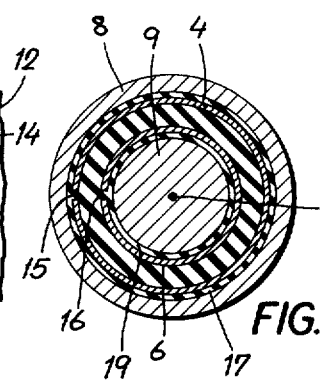
FIG. 3
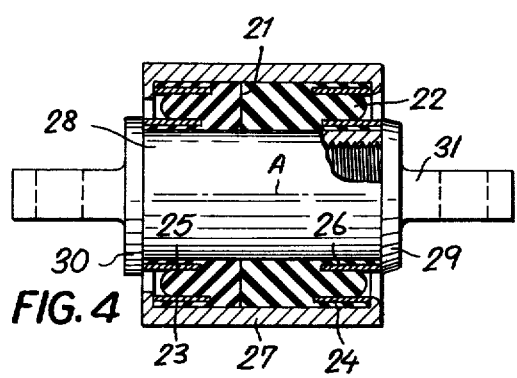
FIG. 4
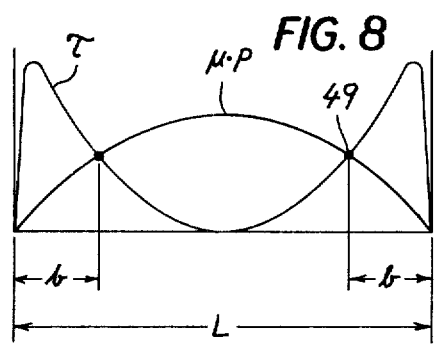
FIG. 8
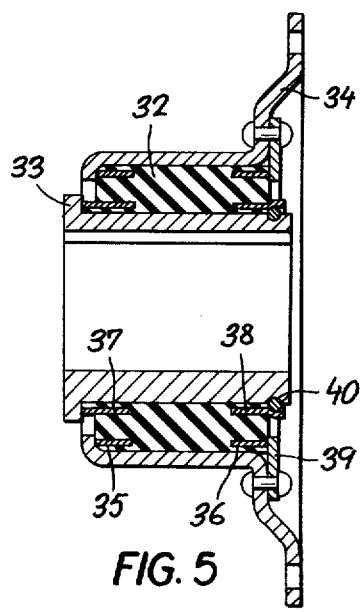
FIG. 5
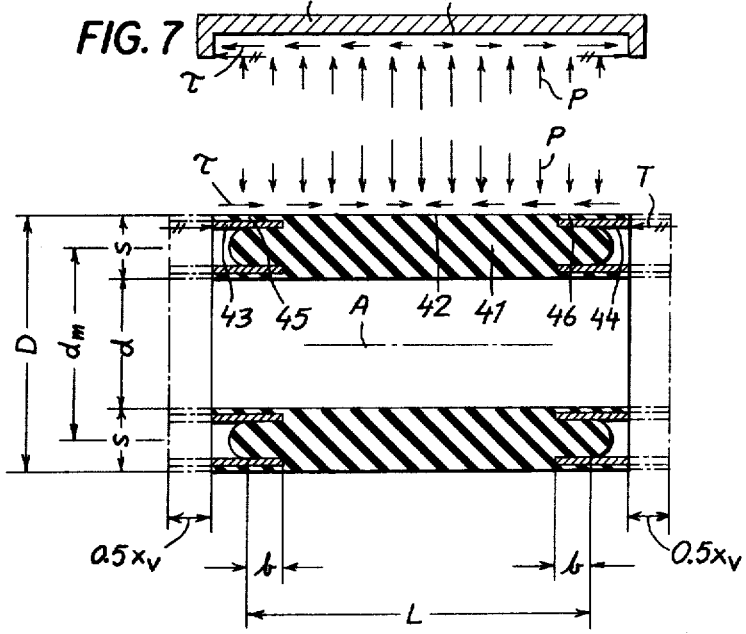
FIG. 7
FIG. 6

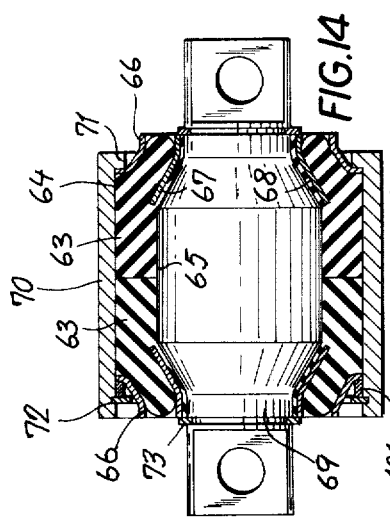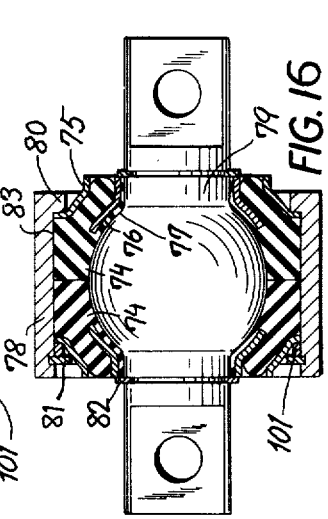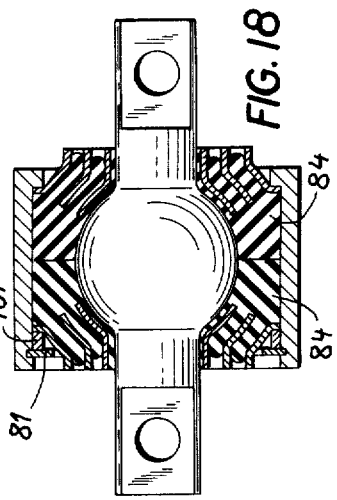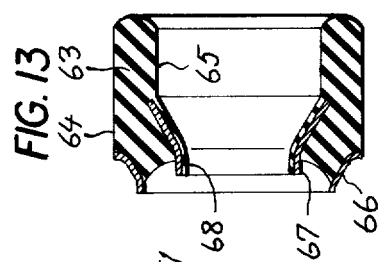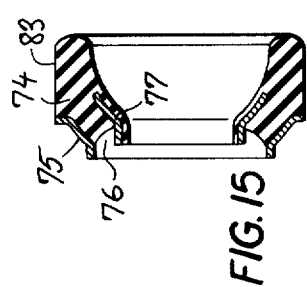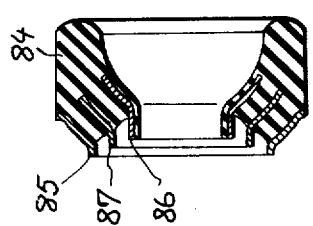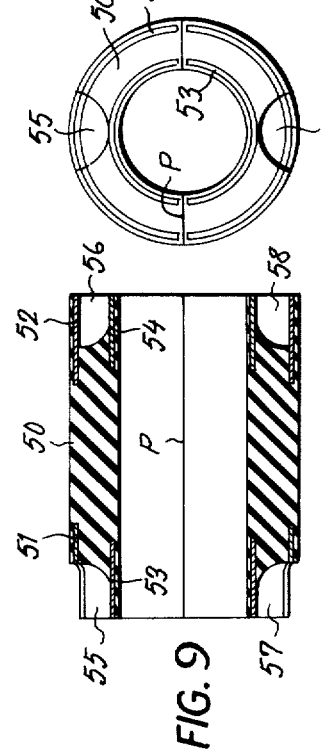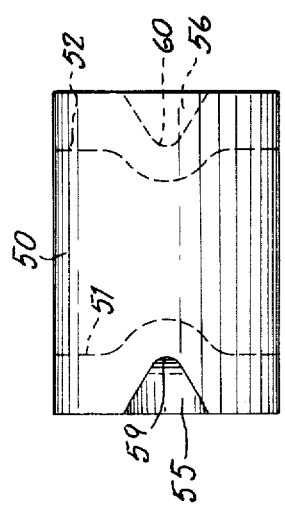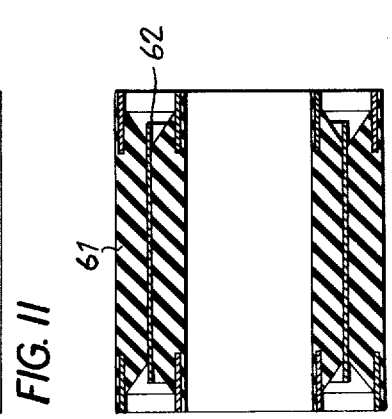

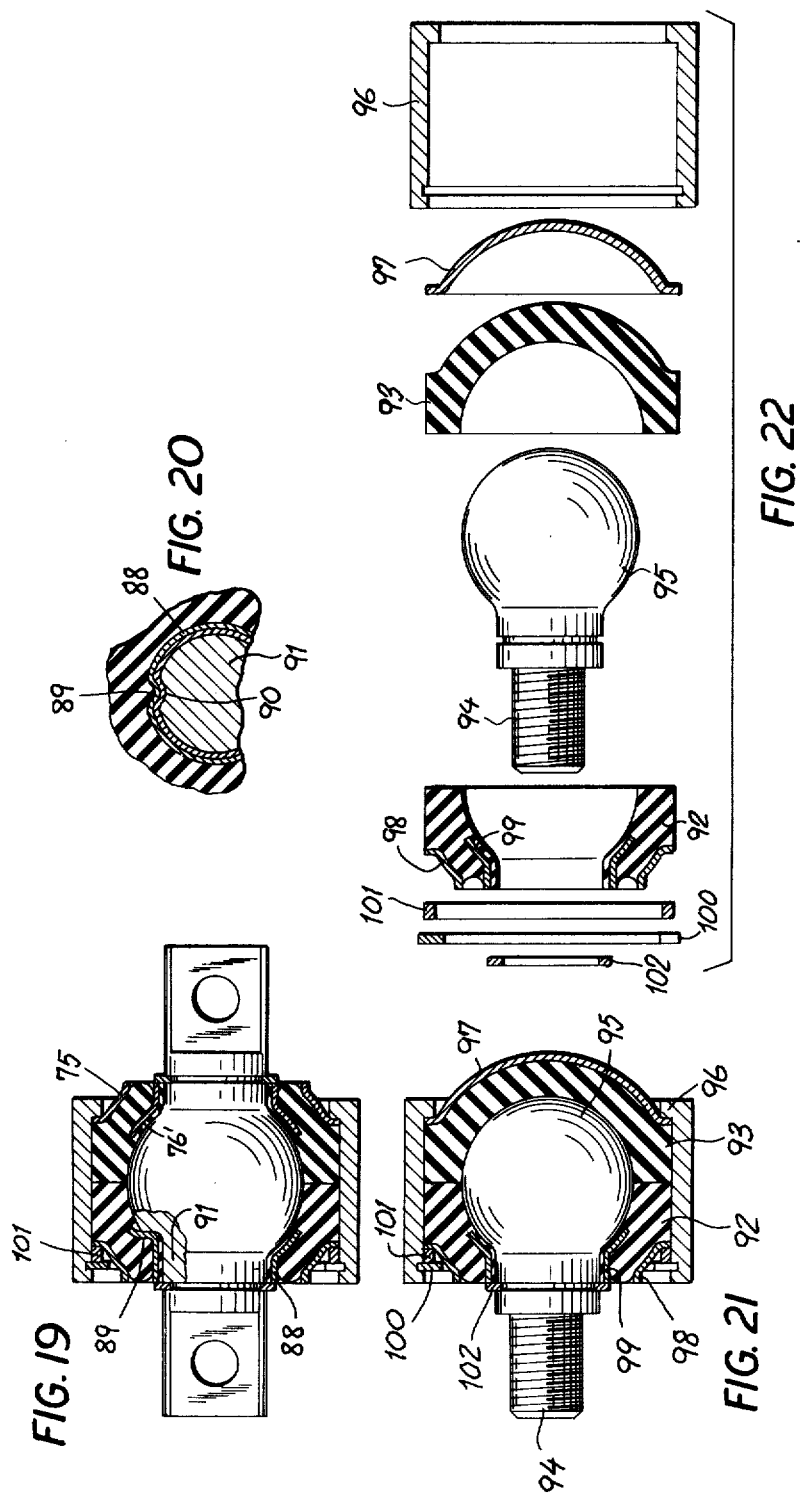

ELASTIC SUPPORT MOUNT

CROSS-REFERENCE TO RELATED APPLICATION

This application is related to copending patent application Ser. No. 532,374 filed Dec. 13, 1974 (now U.S. Pat. No. 3,955,808 issued May 11, 1976) by Raoul Jörn for a PRESTRESSED COMPOSITE SPRING ELEMENT.

FIELD OF THE INVENTION

The present invention relates to an elastic mount. More particularly this invention concerns such a mount adapted to be carried between two metallic parts, one within the other, so as to permit limited oscillating motion of the inner part relative to the outer part.

BACKGROUND OF THE INVENTION

An elastic mount is typically used to hold the steering mechanism, engine, and like parts of a motor vehicle on the frame thereof. Usually an inner part or member such as a pin is fitted through a hole in an elastomeric body of revolution which is itself received in an outer part or member constituted by an eye formed in or carried on the motor-vehicle frame. Such a mount must be able to withstand radially direct forces without substantial deformation, as when, for instance, acting as an axle mount to insure accurate guiding of the axle. In addition such a mounts must have a long service life, a requirement that is particularly hard to meet since the constant oscillations to which it is subjected constitute a considerable strain. It is for this reason that mounts of rubber or a similar elastomer and metal are typically used since the relative motions of the inner part and the outer part are translated into only molecular deformation in the elastomer rather than sliding of surfaces relative to each other. In addition such a mount has the advantage that it is always operational and completely silent. As a rule such elastic mounts employing molecular deformation only are formed as hollow cylindrical sleeves as well as conical, rodlike, semicircle, or spherical mounts.

In such elastic mounts it is necessary that the elastomeric body, which is made of so-called constant-volume material, not be pressed outwardly by radial forces, and it also should not be extruded axially by such forces. If this is allowed to occur radial wall thickness of the elastomeric body decreases so that the inner part will not be centered within the outer part and, for example in an axle mount, the inner part will become misaligned. In addition considerable shifting of the rubber on the metal creates wear and rapid destruction of the rubber. This lateral shifting of the rubber is eliminated in known mounts by vulcanizing to both inner surface and the outer surface of the body a respective metal sleeve that extends over the complete inner and outer surfaces of the elastomeric body and prevent any extrusion from these surfaces.

It is known to prestress these mounts by forcing the unstressed elastomeric body between a pair of metal sleeves, the outer sleeve being of lesser inner diameter than the outer diameter of the body and the inner sleeve being of greater outer diameter in the inner diameter of the body. This prestressing creates a pressure in the body which is proportional to the modulus of elasticity thereof and orients the molecules of the elastomer so as to equalize the stresses in the body. Such precompression increases the rigidity and strength of the mount. The difficulty, however, with such arrangements is that the elastomeric body can still slide relative to the sleeves in which it is mounted. In addition it is necessary that the inner dimensions of the outer part in which the mount is to be secured be exact so as to fit the outer sleeve, and that outer dimensions of the inner part be similarly precise. As a rule the inner sleeve is clamped in place by bolt arrangements so as to prevent shifting of this inner sleeve relative to the central body. Not only is such a mount extremely difficult to remove and replace, but the bolting of the inner sleeve adds expense to the construction of the arrangement.

It is also known to vulcanize the elastic body in place between the inner and outer sleeves. To this end the inner sleeve and the outer sleeve are usually split so as to permit their diameters to be changed in order to prestress the body. In such an arrangement it is almost invariably necessary to machine the sleeves of the mount after they are vulcanized to the rubber. In addition all of the difficulties of fitting the composite unit into the two parts are still present.

Another arrangement is known using a one-piece inner sleeve and an outer sleeve composed of several segments which are all vulcanized to the body and which, when pressed together, prestress the body. The body is split between the segments so that when they are pressed together the splits close and a prestressed assembly is formed. Such a mount is relatively expensive to manufacture.

Thus the known mounts typically have several difficulties. First of all they are relatively expensive to manufacture, as their metal parts must be made to close tolerances so that they must be produced in several different steps. It is necessary that the elements or parts in which or into which such a mount is fitted also be built to close tolerances and frequently provided with supplementary holding devices. Such devices can frequently slip relative to the parts on which they are mounted so as to become relatively ineffective. Furthermore it is usually impossible to remove such a motor mount without destroying it, so that a new mount must be provided each time the assembly is taken apart.

OBJECTS OF THE INVENTION

It is therefore an object of the present invention to provide an improved mount.

Another object is the provision of an improved elastomeric mount formed as a composite spring element adapted to be used between a hollow outer member or part having an inner surface formed to the surface of revolution and an inner part received in the outer part having an outer surface formed as a surface of revolution.

Yet another object is the provision of such a device which can be made at relatively low cost, but which has a long service life and can be removed from between the two members without damage.

Yet another object is to provide a mount which overcomes the above-given disadvantages.

SUMMARY OF THE INVENTION

These objects are attained according to the present invention in such a mount having a solid but hollow elastomeric body of revolution with an outer surface directly engageable against the inner surface of the outer member and an inner surface directly engageable against the outer surface of the inner member. The body has an axial open end and has in an unstressed condition a predetermined overall axial length. An inner metal sleeve and an outer metal sleeve are both formed as bodies of revolution coaxial with the surfaces and imbedded in the elastomeric body at the open end respectively on the inner and outer surfaces of the elastomeric body. These sleeves have an axial length which is a fraction of the axial length of the elastomeric body. Means is provided on at least one of the members engageable with at least one of the sleeves for holding the elastomeric body axially compressed to an axial length less than its predetermined unstressed length. Thus such axial compression forces the surfaces of the elastomeric body tightly against the surfaces of the members.

According to another feature of this invention these sleeves are very thin, having a radial thickness only a fraction of that of the elastomeric body and are fully independent of each other. The sleeves are vulcanized onto the elastomeric body and are only displaced axially in order to prestress it, no radial compression is employed.

Such a mount has an extremely long service life and can be produced at very low cost. The inner and outer sufaces of the elastomeric body bear directly against the corresponding surfaces of the two members which are connected together by the mount. Due to the prestressing, however, an extremely rigid connection is made with almost no possibility of slippage of the body relative to either of the members due to the high frictional adherence stress between the surfaces. On the same line relieving of this axial compression allows the mount to be removed from between the two members without any damage to either the mount or the members. The amount of precompression is directly proportional to the amount of axial shortening of the mount after installation, that is the difference between its unstressed axial length before mounting and its axial length after being secured and clamped in place. According to this invention a snap ring or the like is used on the inner member and/or on the outer member to axially hold the elastomeric body and its sleeves in this compressed condition. Thus the mount according to the present invention is extremely inexpensive to manufacture, and need not be made to exceptionally close tolerances. The small mass of the metal rings or sleeves used at one or both ends of the elastomeric body allows the body to be vulcanized very strongly to them in a very short period of time.

According to yet another feature of this invention each of these rings or sleeves is formed with an axially throughgoing split or slot. In addition the outer surface of each of these sleeves or rings is covered with a layer of elastomeric material the same as the body which is agains vulcanized to the sleeves or rings. In this manner it is possible to employ very inexpensive rolled sleeves of sheet metal. Any imperfection in the tolerances or dimensions of the sleeves is compensated for by the fact that each sleeve is imbedded somewhat below the respective surface of the elastomeric body. In addition the elastomeric layer overlying each of these rings or sleeves increases the coefficient of friction between the corresponding region of the elastomeric body and the corresponding member by at least five times.

In accordance with yet another feature of this invention the elastomeric body is generally cylindrically tubular and is provided at both of its axial ends with a pair of such metal sleeves or rings. Each of these sleeves has an outer end lying at or extending slightly beyond the corresponding axial end of the elastomeric body and an inner end which projects into this elastomeric body to a location at which the frictional adherence stress between the body and the corresponding member caused by the axial pressure is at least equal to the shear stress between the elastomeric body and the member, which shear stress is created by the compression of the elastomer. In a flat elastomeric body of uniform thickness which is pressed on a flat rigid surface, such as a metal plate, and in which shifting of the outer elastomer layer relative to the abutting rigid surface is impeded by vulcanization bonding, glueing, or frictional engagement, both pressure and shear tension are created at the interface between the elastomer and the supporting surface. The pressure tensions run substantially parabolically with the highest value in the middle and a value of zero at the ends or edges of the surface. In an opposite manner the shear tension has in the center a value zero but grows parabolically towards the ends or edges of the elastomeric body and immediately adjacent these edges drops sharply to zero. These tensions are created by the forcing of the constant-volume elastomer outwardly while sliding is resisted by vulcanization or friction between the different parts. As long as the product of the coefficient of friction and the pressure is greater than the shear force caused by the squeezing of the elastomer outwardly there is no need to adhesively adhere the contact surfaces outwardly or inwardly. Since the pressing tension is at its minimum at the outside edges and the shear stress is there at its maximum the elastomer must there be adhesively or otherwise secured, but is adhered only according to the present invention from a point at which the product of the coefficient of friction and the pressing tension is equal to the shear tension. In accordance with the present invention the metal rings or sleeves terminate at this point which may be calculated. Thus in accordance with the present invention metal stabilizing rings are only provided at the axial ends of the device at the outer and inner surfaces thereof, as it has been surprisingly found that only in these regions is there any possibility of lateral slipping.

According to the invention the minimum axial length ($b$) by which the elastomeric body and the vulcanized-on metal rings overlap is equal to:

$$b = \frac{L}{2}\left(1 - \sqrt{\frac{1}{1 + \frac{6}{\mu k z}}}\right)$$

wherein:

$L$ = length of the axially compressed elastomeric body, $\mu$ = coefficient of friction for the elastomeric body, $k$ = a form factor for the elastomeric body, and $z$ = a characteristic factor for the elastomeric body which is calculated according to its dimensions and the axial compression.

According to the invention the elastomeric body having the shape of a body of revolution is subdivided between the metal rings at one or more planes transversely to its axis. The production for instance of a mount in two identical parts each carrying only one metal ring on the outside surface and another on the inner surface is considerably simpler because in this case it is easier to hold the elastomeric body in the vulcanizing mold or die. In addition with longer joint sleeves such a division makes their manufacture relatively simple. With very long bodies of revolution having great diameters it is even advantageous to fabricate the outer axial ends carrying the rings separately from a tubular central portion and only to fit three elements together on assembly of the joint.

According to another feature of this invention the entire joint is subdivided along a plane passing through the axis into two identical semicylindrical pieces. Such an arrangement is advantageous when the joint is to be mounted on a very long shaft which it would be inconvenient to have to slip the joint over.

In accordance with yet another feature of the present invention the metal rings carried at the axial ends of the elastomeric body project axially from this body by a distance equal to a multiple of the radial thickness of the rings. This allows the elastomeric material to be squeezed out between the two rings so as to prevent excessive tensions from being built up at the edges of the vulcanized portion. Thus the possibility of the rings tearing loose from the elastomeric material is considerably decreased.

The elastomeric body may be formed according to another feature of this invention with at least one axially open notch. In this case the metal ring is correspondingly axially lengthened to cover the notch or recess. This type of construction imparts more give to the joint in the radial direction toward the side of the elastomeric body formed with the recess or notch.

The joint according to this invention may be formed of a pair of identical halves each formed as a body of revolution and each having one end adapted to bear against the corresponding end of the other half. The halves are outwardly flared away from their one abutting end and the metal rings are formed as frustocones. With this system axial pressing together of the two ends of the mount creates considerable radially directed pressure at the inside of the mount so as to prevent this element from slipping relative to the two members between which it is fitted. The free end surfaces of the joint are relatively small compared to the cross-sectional area at the center of the joint. Thus a joint with considerable radial strength and stiffness is produced which also axially is much stiffer than the cylindrical joints and allows relatively wide oscillation of the inner member relative to the outer member.

In accordance with yet another feature of the present invention the two-part elastomeric metal body of revolution has a round or oval shape changing in the equatorial region of the outer surface of the elastomer into a cylinder tangential to the round or oval portion with the inner and outer metal ring covering no more than 50 percent of the corresponding surfaces of the elastomeric body. The central portion of the elastomeric body is not covered by metal and in unstressed condition has a greater axial length than it has compressed and mounted in place. In this mount the additional pressure component created by axially pressing together the vulcanized-in-place metal rings creates an extremely high pressure on the members between which the mount is fitted, with the relatively small free end surface greatly inhibiting transverse deformation. This ball-like or ellipsoidal joint thus has an extremely high radial carrying capacity and a sharp spring characteristic. It is also axially very stiff and allows considerable oscillation about its axis. Deflection of such a joint transverse to its central axis only creates shear stresses and only small restoring forces are created. The maximum deflection angle therefore can be 30° in any direction from the axis. If an elliptical cross section is used the maximum radial supporting strength is increased in one direction whereas the deflectibility at a right angle to this direction is decreased.

An advantage of this last-described type of joint is that it can be produced very inexpensively. It need merely be formed of two easy-to-manufacture semispherical pieces. Thus a simple two-part compression mold may be used rather than the traditional multipart injection molding die. With the same size press it is possible to produce approximately four times as many joints according to the present invention. Preheating of the inner ball is not necessary and the amount of heating necessary to vulcanize the relatively thin metal rings in place is small. The typical inner ball bolt weighs around 1.85 kg while the overall weight of the metal parts of the ball joint according to this invention weighs approximately 0.45 kg. Thus the parts needing vulcanization are only about one fifth as much according to the present invention. This decrease in weight also makes the ball joint according to this invention less expensive to transport, and allows the user to employ on replacement the old central ball bolt. Also since the central ball does not have to withstand the high temperature of vulcanization it is impossible to use a central ball made of light metal or synthetic-resin material, once again considerably decreasing weight and cost of the assembly.

According to another feature of this invention the elastomeric body is provided with a sheet metal core having substantially the same shape as the elastomeric body and imbedded fully within an elastomeric body approximately equidistant between the inner and outer surface thereof. The axial ends of this sheet metal core overlap and lie between the rings at the ends of the elastomeric body. This core element prevents transverse deformation of the compressed and outwardly shifted elastomer not only on the surfaces of the elastomeric body but also within it. If however the free core ring is in no contact with either of the members between which the mount is fitted and is not exposed at either of the ends of the mount it can be axially displaced with the elastomeric material so that it normally would not hinder transverse deformation. Since the core ring however overlaps the end metal there is a component of pressure exerted on the core element which tends to act against the shear forces in the elastomer and hold the core sleeve or ring tightly in place. With such a core element it is possible to greatly increase the radial bearing capacity of a joint according to the present invention.

In accordance with yet another feature of this invention the inner metal ring is secured to the inner member. Thus the inner member can be formed with an outwardly open notch and the inner metal ring with an inwardly directed projection that is received on this notch. Such a construction fixes the joint relative to the inner member securely so that even when an excessively large force is exerted on the assembly there will be no slippage. Such formation of the inner ring in no way increases the construction cost or difficulty.

Although the joint is usually formed as a body of revolution having a throughgoing hole, it is possible according to yet another feature of the present invention to design it with a blind hole. More particularly it is possible to form the inside as a socket for a spherical head of a ball bolt. The outer member is therefore formed as a socket and axial pressure is applied by means of a snap ring fitted into this socket and on the ball bolt with the two end rings bearing against these snap rings.

BRIEF DESCRIPTION OF THE DRAWING

The above and other objects, features, and advantages will become more readily apparent from the following, reference being made to the accompanying drawing in which:

FIG. 1 is an axial section through a joint according to the present invention;

FIG. 2 is an axial section through the joint of FIG. 1 shown installed;

FIG. 3 is a section taken along line III—III of FIG. 2;

FIGS. 4 and 5 are axial sections through two joints according to this invention shown here again installed;

FIGS. 6 and 7 illustrate the forces effective on the joint according to this invention;

FIG. 8 is a graph illustrating the forces shown in FIGS. 6 and 7;

FIGS. 9 and 10 are axial and cross section through yet another joint according to the present invention;

FIG. 11 is a side view of the joint of FIGS. 9 and 10;

FIG. 12 is an axial section through yet another embodiment of the joint according to the present invention;

FIGS. 13, 15 and 17 are axial sections through a further joint according to the present invention;

FIGS. 14, 16 and 18 show joints using the halves of FIGS. 13, 15, and 17, respectively in axial section;

FIG. 19 is an axial section through yet another joint according to this invention;

FIG. 20 is a cross section through a detail of FIG. 19;

FIG. 21 is an axial section through another joint according to the present invention; and FIG. 22 is an exploded view of the joint of FIG. 21.

SPECIFIC DESCRIPTION

The joint shown in FIGS. 1-3 has a cylindrically tubular elastomeric body 1 of acrylonitrile-butadiene-styrene and centered on an axis A. This body 1 has an outer cylindrical surface 2 and an inner cylindrical surface 3. A pair of cylindrical tubular rings or sleeves 4 and 5 are provided at the axial ends of the body 1 at the outer surface 2 and a similar such pair of rings 6 and 7 are provided at the inner surface 3. Thin layers 17–20 of the same elastomeric material as body 1 cover the respective rings 4–7 which project axially from the ends of the body 1 and have a width w equal to approximately one-fifth of the overall axial length L of the joint. The rings 4 and 6 are split at 15 and 16 and made of steel. Rings 5 and 7 are similarly split.

As better illustrated in FIGS. 2 and 3 the joint is adapted to be received between an outer cylindrically tubular element 8 and an inner rod element 9. The entire joint is compressed to the length L' equal to between 0.7L and 0.9L, here 0.8L. The outer end of the ring 5 is braced against a shoulder 13 formed by the two-part outer eye 8 and the corresponding ring 7 bears against a shoulder 14 formed on the rod 9. The rings 4 and 6 bear axially against snap rings 10 and 11 fitted into the members 8 and 9 respectively. Comparison of FIGS. 1 and 2 shows how as the joint is compressed axially it is forced out between the rings 4 and 6 at one end and 5 and 7 at the other end as shown at 12. The arrangement of FIG. 4 is similar to that of FIG. 1 except that here a two-part elastomeric body 22 is used which is subdivided along a plane 21 perpendicular to the axis A. The outer member 27 has bent-over ends against which bear against the rings 23 and 24 and the inner rings 25 and 26 bear against flanges 29, 30 of a two-part bolt 28 and 31. This arrangement is adapted to be mounted on the end of a shock absorber.

The elastomeric cylindrical body 32 shown in FIG. 5 is secured between a flange 33 of a shaft element and a hub element 34. The outer rings 35 and 36 are compressed between the bent-over ends of the hub element 34 and a plate 39 riveted thereto. The one inner ring 37 bears against the flange 33 and the other inner ring 38 is held in place by a snap ring 40. Such an arrangement is used to transmit rotary force between the inner member and the outer member.

FIG. 6 shows a tubularly cylindrical elastomeric body 1 having an outer surface 42 in which are imbedded end rings 43 and 44 covered by similar elastomeric layers 45 and 46. This surface 42 is adapted to be engaged against an inner surface 47 of an eye 48 shown in FIG. 7. When an axial force T is effective on the metal rings 43 and 44 the elastomeric body 41 is compressed axially so as to bring about pressure or compressive stress as indicated by arrows $r$ perpendicular to the axis A of the body 1. FIGS. 6 and 7 show how these forces $p$ are at their greatest at the center of the arrangement and less toward the end thereof. In addition this creates tangential strain or sheer stress from the outside as is indicated by arrows $\tau$. These stresses $\tau$ are at their minimum at the very center, increased parabolically toward the ends, and drop off abruptly immediately adjacent these ends.

FIG. 8 compares the stresses $\tau$ and the frictional forces or adherence stress equal to the quotient of the coefficient of friction $\mu$, here 0.7 for rubber on steel, multiplied by the pressure $p$. Characteristic lines of these two pressures cross on the length L of the elastomeric body 41 at point 49 separated by a distance $b$ from the ends thereof. This distance $b$ is equal to the overlap of the rings 43 and 44 with the body 41.

The distance $b$ can be mathematically determined from the relationship $\mu \times p = \tau$. It has been discovered that the forces increase and decrease parabolically along the element so that the distance $b$ can be calculated from the following formula:

$$b = \frac{L}{2}\left(1 - \sqrt{\frac{1}{1 + \frac{6}{\mu k z}}}\right).$$

In this formula small letter $z$ is determined by the measurements and the axial prestressing of the elastomeric body. The form factor $k$ is determined by the relationship between the average surface, calculated as $$\pi \times \frac{D + d}{2} \times L$$

to the free surface calculated as $$\pi \times d_m \cdot \frac{D - d}{2}$$

This factor $k$ serves to calculate the spring characteristic with radial loading of the elastomeric body and determines how many times the modular elasticity must be greater than the shear modulus of the elastomer.

The characteristic $z$ is calculated according to the formula:

$$z = \frac{5}{8 x_v} \left( -D + \sqrt{D^2 + 1.2 (D^2 - d^2) \frac{x_v}{L}} \right)$$

wherein:
$D$ equals outside diameter,
$d$ equals inside diameter,
$x_v/L$ equals axial compression, and
$L$ equals length of the axially compressed elastomeric body.

The arrangement shown in FIGS. 9, 10, and 11 has a generally elastomeric body 50 to which are vulcanized outer rings 51, 52 and inner rings 53 and 54. In addition this body 50 is formed with cutouts or notches 55–58 axially in line with one another and diametrically opposite the notches 57 and 58. As best seen in FIG. 11 the rings 51–54 are all widened adjacent the cutouts 55–58 so as to radially cover these cutouts. In addition the rings 51 and 52 are cut out and formed with notches 59 at the respective cutouts 55 and 57. The body 50 and sleeves 51–54 are split along an axial plane P.

The arrangement of FIG. 12 is identical to that of FIG. 11 except that here the elastomeric body 61 is provided with a core sleeve 62 extending axially generally the full length of the body 61 with its axial ends extending between the inner ends of the end rings. This sleeve 62 is split and imbedded in the body 61 radially equidistant from the inner and outer surfaces thereof.

The arrangements shown in FIGS. 13 and 14 has a pair of identical elastomeric bodies 63 whose inner and outer surfaces 64 and 65 are provided with respective generally frustoconical rings 66 and 67. The inner ring is covered with an elastomeric layer 68 and the outer ring 66 is uncovered on its outer side. Two such elastomeric bodies 63 are used to secure a central throughgoing bolt 69 within an outer sleeve or eye 70. Bolt 69 has large-diameter cylindrical center regions and then tapers outwardly, with the tapered regions lying against the elastomeric covering 68 of the frustoconical rings 67. The sleeve 70 is provided at one end with a lip 71 which engages axially against the one ring 66 and at the other end the ring 66 is held in place by a washer 101 and snap ring 72. In addition snap rings 73 are provided which axially engage the smaller axial ends of the inner rings 67 and serve axially to precompress the joint.

The arrangement shown in FIGS. 15 and 16 has a pair of generally frustoconical elastomeric bodies 74 each with an inner surface formed as a circularly arcuate body of revolution and provided with rings 75, 76 like the rings 66 and 67, with the ring 76 covered by an elastomeric layer 77. A throughgoing ball bolt 79 is adapted to be secured in a sleeve 78 by the joint. This sleeve 78 has a cylindrical inner surface and is formed at one end with an overhanging lip that engages the one ring 75 and is fitted with a snap ring 81 which engages via washer 101 with the other ring 75. Snap rings are provided which engage the rings 76.

The arrangement in FIGS. 17 and 18 is identical to that in FIGS. 15 and 16 except that here the elastomeric body 84 is provided with an outer ring 85, and inner ring 86, and a core ring 87.

In this arrangement it is unnecessary to block the core ring 87 or the center ring 86 to compress the arrangement axially, as the inner periphery of the outer ring 85 radially overlaps the outer periphery of the core ring 87 whose inner periphery in turn overlaps the outer periphery of the center ring 86. Thus only the snap ring 81 and a positioning 101 need be used.

FIGS. 19 and 20 show a joint essentially identical to that of FIGS. 15 and 16 except that here one of the inner rings 76 is replaced by an inner ring 88 with an inwardly extending projection 89 received in a corresponding notch 90 of the ball bolt 91.

The mount shown in FIGS. 21 and 22 has two elastomeric bodies of revolution 92 and 93. The inner member 94 is provided with a ball head 95 and the joint is received in a sleeve 96. The one end of the sleeve 96 is closed by a sheet-metal domed plate 97 of part-spherical shape. The other elastomeric body 92 is provided with rings 98 and 99 which are respectively held in place by a snap ring 100 bearing against a spacer ring 101 by a further snap ring 102.

We claim:

1. An elastic mount for use between an outer member having an inner surface formed generally as a surface of revolution and an inner member in said outer member and having an outer surface formed generally as a surface of revolution, said mount comprising:
    a solid circumferentially continuous elastomeric body of revolution having an outer surface directly engageable against said inner surface of said outer member and an inner surface directly engageable against said outer surface of said inner member, said surfaces normally being coaxial, said body having an axially open end and having in unstressed condition a predetermined overall axial length;
    an inner metal sleeve and an outer metal sleeve both formed as bodies of revolution coaxial with said surfaces and imbedded in said elastomeric body at said open end and respectively generally on said inner and outer surfaces of said elastomeric body, said sleeves having axial lengths equal to a fraction of said predetermined length of said body whereby the major part of the axial length of said body is free from such sleeves, at least one of said sleeves projecting at said end beyond the remainder of said body; and
    abutment means on at least one of said members acting upon opposite axial ends of said body and bearing against said one of said sleeves for holding said elastomeric body axially compressed to an axial length less than said predetermined length, whereby said axial compression forces said surfaces of said elastomeric body tightly against said surfaces of said members.

2. The mount defined in claim 1 wherein said sleeves are each formed with a respective single axially throughgoing split, said elastomeric body including a thin layer of elastomeric material on said surfaces of said elastomeric body overlying said sleeves.

3. The mount defined in claim 2 wherein each sleeve extends axially into said elastomeric body at least to the location therein where the frictional adherence stress created by the axial compression is equal to the shear stress created by the deformation of said elastomeric body and between said elastomeric body and the respective member.

4. The mount defined in claim 3 wherein each of said sleeves is axially imbedded in said elastomeric body by a distance $b$ calculated according to the formula:

$$b = \frac{L}{2}\left(1 - \sqrt{\frac{1}{1 + \frac{6}{\mu k z}}}\right)$$

wherein:
  $L$ = the compressed length of said body,
  $\mu$ = coefficient of friction between said sleeves and said body,
  $k$ = a shape factor for said elastomeric body, and
  $z$ = a factor calculated from the dimensions and axial compression of said elastomeric body.

5. The mount defined in claim 3 wherein said elastomeric body is provided at both of its axial ends with a pair of such inner and outer sleeves and is subdivided in two halves between said ends at a plane generally perpendicular to the axis of said body.

6. The mount defined in claim 3 wherein said elastomeric body and said sleeves are subdivided axially into two like parts.

7. The mount defined in claim 3 wherein said sleeves have a radial thickness and project axially from said elastomeric body by a distance equal to a multiple of said thickness.

8. The mount defined in claim 3 wherein said sleeves are vulcanized to said elastomeric body.

9. The mount defined in claim 3 wherein said elastomeric body has two such axially open ends each tapering outwardly and provided with a pair of such sleeves each of generally frustoconical shape, said body having a generally cylindrical center region between said tapering ends and being split at said center region into two halves along a plane perpendicular to the axis of said body.

10. The mount defined in claim 3 wherein said elastomeric body is generally cylindrical at said open end and has a region adjoining the cylindrical end of part-spherical shape.

11. The mount defined in claim 10 wherein said elastomeric body is formed with a blind part-spherical recess and is subdivided into two parts along a plane perpendicular to the axis of said body and lying on an equator to said part-spherical recess, said mount further comprising a metal plate secured in said outer member and axially covering said elastomeric body at the end thereof opposite said axial end.

12. The mount defined in claim 10 wherein said sleeves are generally frustoconical and said inner sleeve has an outer periphery spaced radially inwardly from the inner periphery of said outer sleeve, said mount further comprising a generally frustoconical core sleeve between said inner and outer sleeves and radially overlapping said inner and outer peripheries.

13. The mount defined in claim 3 wherein said inner member is formed with a radially outwardly open recess and said inner sleeve and said elastomeric body are formed with radially inwardly extending projection received in said recess.

14. The mount defined in claim 3 wherein said elastomeric body has two such axially open ends and said mount comprises two such sleeves at each end, said mount further comprising a core sleeve fully imbedded in said elastomeric body between the ends and inner and outer surfaces thereof and having axial ends extending between said inner and outer sleeves.

* * * * *